United States Patent [19]
Nichols et al.

[11] Patent Number: 5,439,191
[45] Date of Patent: Aug. 8, 1995

[54] RAILGUN THRUSTER

[75] Inventors: Steven P. Nichols; William F. Weldon, both of Austin, Tex.

[73] Assignee: Board of Regents, The University of Texas System, Austin, Tex.

[21] Appl. No.: 17,524

[22] Filed: Feb. 16, 1993

[51] Int. Cl.$^6$ .............................................. B64G 1/26
[52] U.S. Cl. ................... 244/169; 60/203.1; 60/202
[58] Field of Search ............... 89/8; 60/203.1, 202, 60/204; 244/169

[56] References Cited

U.S. PATENT DOCUMENTS

| | | | |
|---|---|---|---|
| 3,128,595 | 4/1964 | Meyer | 60/203.1 |
| 3,209,189 | 9/1965 | Patrick | 60/202 |
| 3,298,179 | 1/1967 | Maes | 60/202 |
| 4,694,729 | 9/1987 | Hall | 89/8 |
| 4,754,601 | 7/1988 | Minovitch | 60/204 |
| 4,821,509 | 4/1989 | Burton et al. | 60/203.1 |
| 4,854,215 | 8/1989 | Jasper | 89/8 |
| 4,884,489 | 12/1989 | Zowarka et al. | 89/8 |
| 4,934,243 | 6/1990 | Mitcham et al. | 89/8 |
| 4,953,441 | 9/1990 | Weldon et al. | 89/8 |
| 4,993,311 | 2/1991 | Kemeny et al. | 89/8 |
| 5,005,484 | 4/1991 | Witt | 102/501 |
| 5,017,549 | 5/1991 | Robertson | . |
| 5,076,223 | 12/1991 | Harden et al. | 123/143 B |

OTHER PUBLICATIONS

Sutton, George P., *Rocket Propulsion Elements: An Introduction to the Enigineering of Rockets* at pp. 10–11 (5th ed. 1986).

Mantenieks et al., "Performance of a 100 kW Class Applied Field MPD Thruster," *NASA Technical Memorandum* 102312, AIAA-89-2710, prepared for the 25th Joint Propulsion Conference, Monterey, Calif. (Jul. 10–12, 1989). Pp. 1–17.

K. Kuriki et al., "MPD Thruster Test on Engineering Test Satellite," Presented as Paper 79-2071 at Princeton/AIAA/DGLR 14th International Electric Propulsion Conference (Oct. 30–Nov. 1, 1979). Pp. 605–615.

K. Uematsu, et al., "MPD Thruster Performance with Various Propellants," 22 *J. Spacecraft* pp. 412–416 (Jul.–Aug. 1985).

*Primary Examiner*—William Grant
*Attorney, Agent, or Firm*—Arnold, White & Durkee

[57] ABSTRACT

A satellite thruster system capable of creating a high velocity plasma jet is disclosed. The plasma accelerator, or "railthruster," features a high energy current pulse source and a geometrically configured coaxial or parallel dual-rail ignitor system for higher velocity, and thus more fuel efficient, satellite attitude control. A ratio of a length of the railthruster to a spacing between the rails is at least 3:1.

31 Claims, 8 Drawing Sheets

RAILGUN THRUSTER

BACKGROUND OF THE INVENTION

The invention relates to a method and apparatus for production of thrust for space applications, including satellite attitude control, orbital transfer, and advanced missions, with minimal fuel consumption.

One of the limiting factors in the lifetime of a satellite is the amount of fuel required to operate the satellite's thrusters for, among other things, attitude control. The attitude control of a satellite is the control of its orientation in space, which is required to reposition the satellite for communication purposes such as international news, weather reports, and defense intelligence.

Several perturbation forces act to disturb the trajectory, change the plane and shape of the orbit, and alter the time position of satellites during their lifetime in space. Accurate satellite attitude control systems are required to correct these perturbations. Attitude control systems also allow the satellite to orient itself in a specific direction. The orientation of the satellite permits the positioning of instruments such as telescopes, solar cell array panels, or antennae in specific directions.

An attitude control system is typically equipped with: (1) an attitude sensing device, (2) thrusters to adjust the angular position of the satellite, and (3) a control command system to operate the thrusters. Generally, the satellite attitude control is performed about three perpendicular axes, since the satellite has six degrees of rotational freedom. To provide torque, two thrusters of equal thrust and equal firing times are fired. As shown on the satellite depicted in FIG. 1, the thrusters x—x and x'—x' apply torque that allow for rotation about the x-axis. A minimum of twelve thrusters are required for application of torque about the three axes x, y, and z. The satellite shown in FIG. 1 uses sixteen thrusters 18; thus, in addition to providing rotational torque, the thrusters may also provide translational forces. For example, if thrusters x and x' (located on opposite sides of the spacecraft) fire simultaneously, the resulting force will propel the spacecraft along the y-axis.

Magnetoplasmadynamic (MPD) thrusters, which are electromagnetic propulsion devices that accelerate a heated propellant plasma, are known in the art. The plasma is created from super-heated gas, and comprises a mixture of electrons, positive ions, and neutral atoms that conducts electricity readily at temperatures above 5,300° C. To provide the necessary thrust for satellite attitude control, a magnetic field is generated in the MPD thrusters, which generates a J×B magnetic force, or Lorentz force, perpendicular to the magnetic field on the plasma. The magnetic field accelerates a plasma in the bore of the thruster in one direction, which in turn accelerates the thruster itself in an opposite direction.

The selection of the propellant species for an MPD thruster is based not only on the desired thrust performance, but also on its ease of storage and supply, as well as its impact on the spacecraft environment. The thrust performance is assessed in terms of the magnitude of the thrust, thrust efficiency, and electrode erosion. From the viewpoint of storage and supply on board the satellite, such gases (generally molecular) as water, carbon dioxide, carbon monoxide, and ammonia are favorable.

Conventional MPD-type thrusters suffer from numerous practical flaws, including excessive cathode electrode erosion, excessive weight of the magnetic coils necessary to induce the magnetic field, and, most significantly, from excessive fuel consumption. Based on current industry standards, enough fuel must be supplied to enable the satellite to remain in orbit at least 7 years to amortize the launch cost of a satellite and allow the owner to recoup its investment. However, excessive fuel consumption increases the weight of fuel required to supply the satellite for a given time period, and correspondingly, increases the cost of inserting the satellite into orbit. Reduced fuel consumption can reduce the weight of the satellite, correspondingly reducing the launch cost and cost amortization period. Similarly, if the percentage of a satellite's weight attributable to fuel is reduced, additional operative equipment may be included on the satellite, allowing even quicker recovery of satellite launch costs.

SUMMARY OF THE INVENTION

The present invention remedies the inherent limitations of prior satellite thruster devices by utilizing a plasma accelerator capable of designing the plasma acceleration characteristics to improve fuel efficiency and reduce the costs associated with launching and maintaining a satellite in orbit.

Principles of conservation of momentum indicate that as velocity increases, mass decreases for constant momentum. This follows from Newton's Second Law, which equates the force operative on an object with the mass of the object multiplied by its acceleration (F=ma). Accordingly, the invention develops a high energy plasma that produces a very high velocity plasma jet, which reduces the mass of the plasma required to be displaced for the same momentum, allowing maintenance of attitude control with minimal fuel. A suitable power source for this new type of thruster is also presented.

Short thrust bursts minimize fuel consumption. Thus, supersonic jet velocities are desired, but such velocities cannot be attained via thermal expansion alone. Because thermal expansion dominates the jet ejection forces of the MPD thrusters, these prior thrusters will not achieve the high velocity of the present invention.

The railgun plasma accelerator, or railthruster, of the present invention operates on the principle of electromagnetics as a nearly ideal plasma acceleration and ejection device. Electromagnetic forces may be as much as 100 times larger than thermal expansion forces for a properly designed plasma acceleration system. Current flow is induced in electrodes or rails, creating an electromagnetic field in the railthruster bore. The interaction of this field with the plasma current creates a J×B electromagnetic force (Lorentz force) which accelerates the arc down the railthruster bore and ejects it into space. Depending upon the magnitude of the current, plasma propagation velocities between Mach 1.2 and Mach 30 can be achieved.

The present invention achieves the performance of an ideal plasma accelerator and ejector through use of a novel configuration. To increase the plasma jet velocity and thereby increase fuel efficiency and prolong satellite life, the present invention has a large ratio of bore length to electrode spacing, or "aspect ratio." By increasing this aspect ratio, the present invention can achieve supersonic jet velocities. An aspect ratio of at least 3:1 is desirable and above 6:1 is preferred. An aspect ratio of at least 10:1 is useful in some applications.

Another feature of the present invention is the insulation of the electrodes from the mounting bracket along the entire bore length. If the electrodes were electrically connected to the mounting portion of the railthruster between the plasma initiation point and the muzzle end, acceleration of a plasma by a Lorentz force would not occur because the electromagnetic forces acting on the plasma would be balanced. In the present invention, the conductor configurations result in equal currents flowing to and from the plasma from the plasma initiation end. This creates a higher magnetic field behind the plasma (closer to the plasma initiation end) and a low magnetic field ahead of the plasma. This difference in magnetic field causes a magnetic pressure, which accelerates the plasma through the bore between the conductors and out the muzzle end, creating thrust.

For some applications, it may be preferred that one of the electrodes be grounded to its mounting bracket. In such applications, for the reasons stated above, the grounding point must be located behind the plasma initiation point. Additionally, it is preferred that the distance between the grounding point of the grounded electrode and the plasma initiation point be at least equal to the diameter of the bore, and preferably two to three times that diameter.

A fuel suitable for use in the railthruster of the present invention is hydrogen, which may be stored in the form of a plastic. Many hydrogen-containing plastics store well in space, are easy to handle (relatively nonvolatile, etc.) and ablate with an insignificant amount of charring. Exemplary plastics include polyethylene $(C_nH_{2n+2})$ or polypropylene $((C_3H_5)_n)$.

To maintain the optimal plasma velocity, the present invention preferably uses an improved high energy power supply that supplies high-current pulses on the order of from 1.5 kA to 3.5 kA. By increasing the current, the $J \times B$ electromagnetic force is boosted such that the plasma jet is accelerated to velocities of 1 to 2 km/s or greater. Increased velocity will reduce the amount of plasma that must be accelerated and ejected to achieve a given force, and thus will reduce fuel consumption. During discharge of the power supply, a solid propellant such as polyethylene will ablate, dissociate, and provide plasma for ejection and thus thruster acceleration. The propellant of the thruster could also be a gas, solid, or liquid provided from an external source. The power supply is preferably connected to a high energy switch for selectively coupling current from the power supply to the thrusters to provide for thruster activation when desired.

The present invention contemplates both a coaxial and a parallel rail configuration. The preferred configuration is the coaxial configuration, which comprises two coaxial rails. The cylindrical geometry provides uniform current distributions on the two conductors, which eliminates current concentrations associated with square bore railgun conductors. Thus, current may be supplied at high levels without generating "hot spots," or areas of localized melting caused by current concentrations. The symmetry of the coaxial structure also provides a uniformly distributed rail separation force, which simplifies the railgun construction because extensive inner support structures are not required. In turn, the overall mass of the railthruster is reduced, corresponding to a lower launch cost.

In the coaxial configuration, the inductance gradient, which determines the amount of accelerating force for a given amount of current, varies inversely with the distance from the center. To optimize acceleration of the plasma, the ratio of the radius of the outer cylindrical rail to the radius of the inner cylindrical rail ("radial ratio") is preferably on the order of 6:1, and more preferably on the order of 10:1.

Further objects, features, and advantages of the present invention will be apparent from the following detailed description when taken in conjunction with the accompanying drawings.

DESCRIPTION OF THE PREFERRED EMBODIMENT

Figure 1:
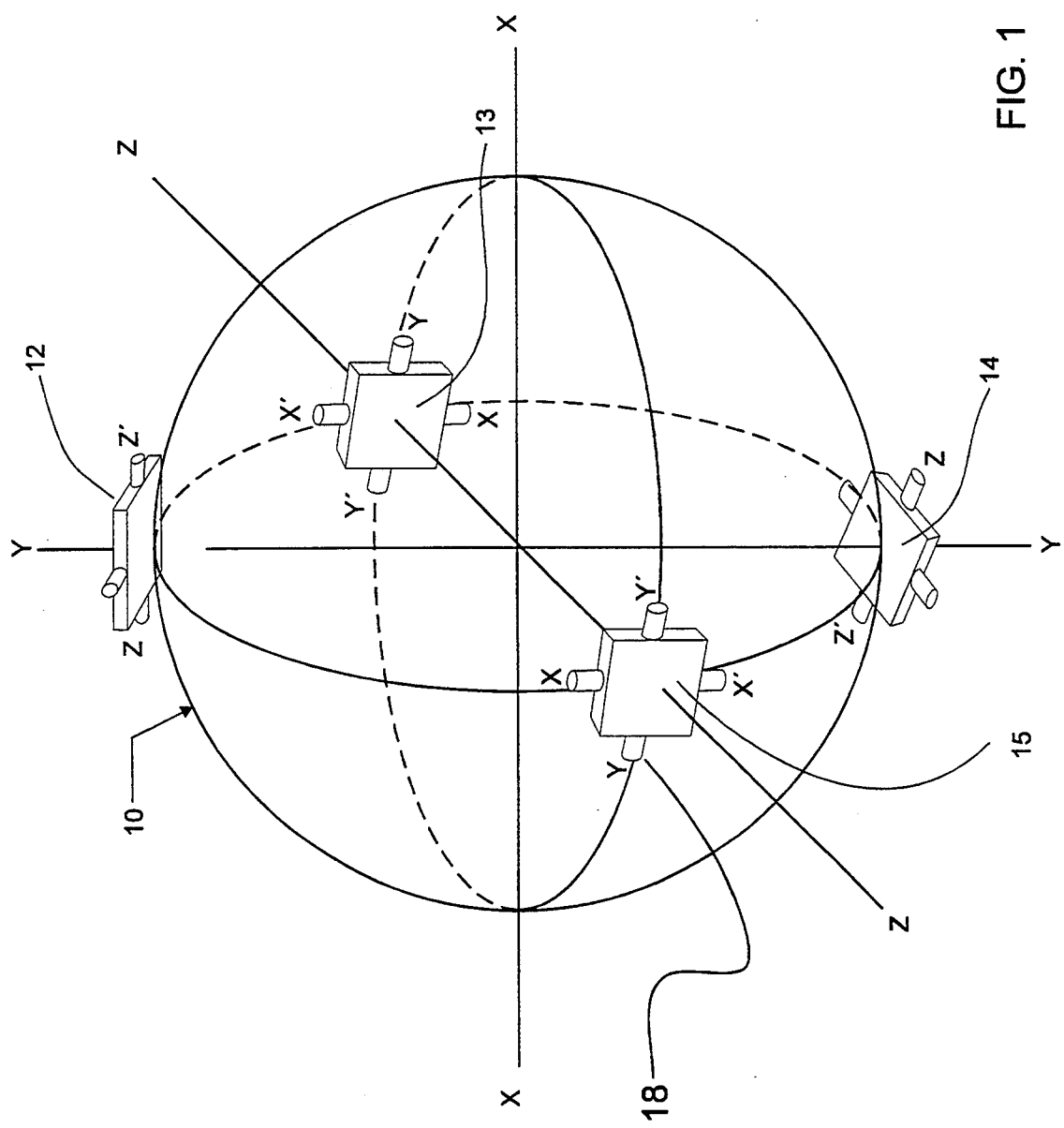
FIG. 1 is a diagrammatic view of a satellite including a railthruster attitude control system.

FIG. I is a diagrammatic view of a satellite including a railthruster attitude control system. Satellite attitude control is performed about three perpendicular axes X, Y and Z. Satellite 10 as shown is equipped with four sets of railthrusters 18, which together provide for adjustment of the satellite in six degrees of freedom. A minimum of twelve thrusters are required for application of torque about the three axes.

Thruster set 12 provides attitude control relative to the X and Z axes, working in coordination with thruster set 14. For example, firing the x' thrusters in each set will rotate the satellite in one direction about the X axis. Additionally, firing the x thruster in set 12 and the x' thruster in set 14 simultaneously will produce a translation of satellite 10 along the Z axis. Similarly, thruster set 13, working in coordination with thruster set 15, provides attitude control relative to the X and Y axes. For example, firing the y' thrusters in sets 13 and 15 simultaneously will produce a rotation about the Y axis. Additionally, firing the x thruster in set 15 and the x' thruster in set 13 simultaneously will produce a satellite translation along the Y axis. Firing the y' thruster of set 15 and the y thruster of set 13 simultaneously will produce a satellite translation along the X axis.

Figure 2:
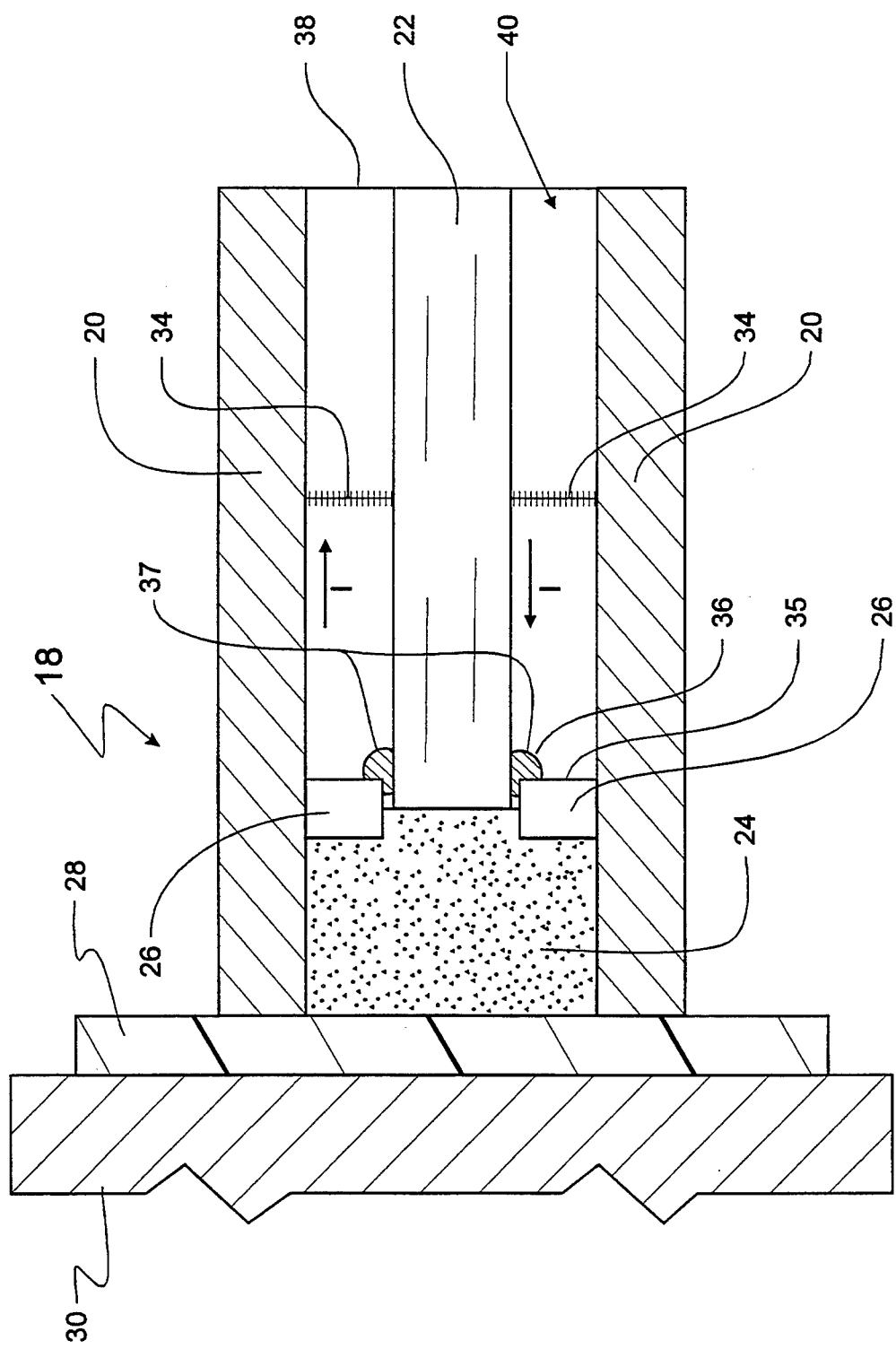
FIG. 2 is a cross-sectional view of a coaxial-electrode railthruster according to the present invention.
Figure 3:
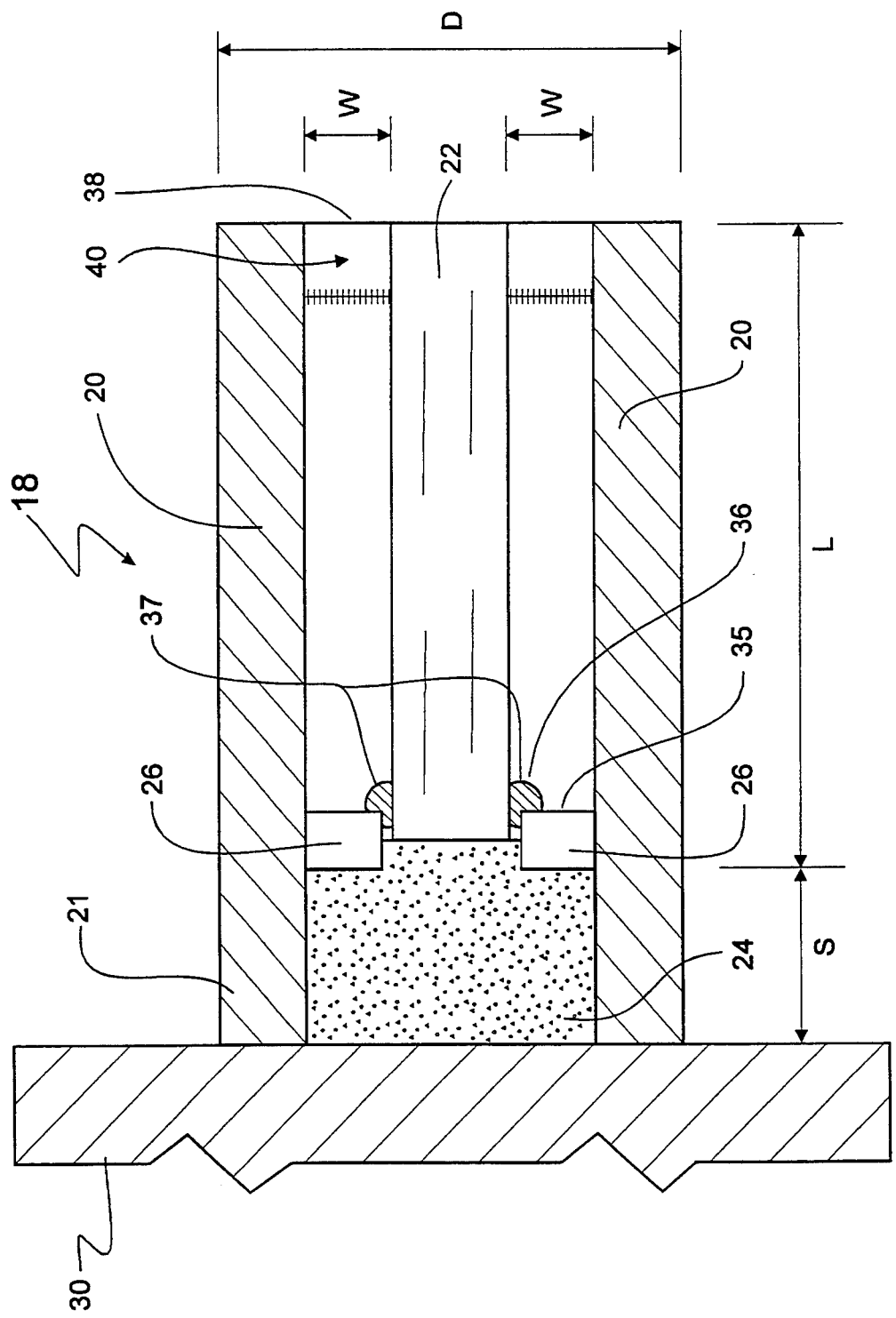
FIG. 3 is a cross-sectional view of plasma acceleration along a coaxial electrode railthruster with outer electrode electrically connected to the mounting bracket.

FIG. 2 is a cross-sectional view of coaxial-bore railthruster 18 of the present invention. Coaxial-bore railthruster 18 comprises outer electrode 20 and mounting bracket 30 placed substantially perpendicular to one another, separated by insulator 28. Outer electrode 20 is substantially cylindrical in shape and centered around a central axis traversing inner electrode 22. As shown in FIG. 3, outer electrode 20 may be electrically connected to ground (mounting bracket 30) as long as plasma initiation end is between connection 21 and muzzle end 38 of railthruster It has been found that when the electrical connection 21 between outer electrode 20 and mounting bracket 30 is between plasma initiation end 36 and muzzle end 38, the Lorentz force due to the current flowing in outer electrode 20 will substantially cancel the Lorentz force due to the current flowing in inner electrode 22, thus resulting in little or no movement of arc 34 along electrodes 20 and 22 from plasma initiation end 36 to muzzle end 38 due to electromagnetic forces. For best results, it is preferred that the distance S (illustrated in FIG. 3) between plasma initiation end 36 and connection point 21 of outer electrode 20 to ground be at least as great as the diameter D of bore 40, and preferably two to three times that diameter.

To establish an electromagnetic field, a current path I is shown in FIG. 2 as entering outer electrode 20 and exiting inner electrode 22. Alternatively, current I may enter inner electrode 22 and exit outer electrode 20. A pulsed current source (not shown in FIG. 2) is coupled to railthruster 18 and provides the necessary current. To complete the current path, arc 34 forms between outer and inner electrodes 20 and 22. During each current pulse cycle, arc 34 begins at initiation end 36 and travels towards muzzle end 38 of railthruster 18, as shown in FIG. 3.

To help ensure that mechanical manufacturing tolerances, or aging effects (such as deformation or combustion product build up) do not result in the plasma being initiated at other than the plasma initiation end 36, plasma initiation gap 35 may be formed at plasma initiation end 36 of railthruster 18 between conductive protrusions 37 and outer electrode 20. Protrusions 37 are not required, but help to ensure that the plasma is initiated at plasma initiation end 36, and may be formed integrally with or conductively coupled to inner electrode 22. Other structures for plasma initiation gap 35 are also acceptable as long as they function to ensure arc initiation at initiation end 36. However, even without plasma initiation gap 35 and protrusions 37, the combination of several inherent features of the current invention promote plasma initiation at plasma initiation end 36:

(1) Surface tracking, which is a known property of insulators, occurs along electrodes 20 and 22 by the plasma. This results in breakdown along a surface (such as plasma initiation end 36) before breakdown through the bore 40.

(2) Inductive effects tend to induce plasma initiation at plasma initiation end 36, because this is the location of least inductance along the length of the rails electrodes 20 and 22.

(3) Finally, assuming operation of the railthruster in the vacuum of space, there will be a higher concentration of sublimed fuel (hydrogen ions) near the fuel source, which is located at plasma initiation end 36.

Because railthruster 18 distributes electrical energy over a large surface area and because arc 34 accelerates down the inner and outer electrodes leaving little time available for electrode erosion, railthrusters 18 should not exhibit electrode erosion except near initiation end 36. Low currents can be used to initiate arc 34 to minimize electrode erosion. Following the establishment of the arc using low current, the current can be ramped up to higher levels to accelerate the arc since there is little time for electrode erosion as the arc accelerates down the rails. Further, both outer and inner electrodes 20 and 22 can be coated with or made from a noble, precious, or refractory metal extending a length of approximately 1–10 bore diameters from the plasma initiation end 36. Acceptable metals for this purpose include, for example, platinum, rhodium, tungsten, and molybdenum.

The spacing W between outer electrode 20 and inner electrode 22 is approximately equal to the radius of bore 40 through which arc 34 is accelerated from initiation end 36 to muzzle end 38 of bore 40. The plasma is accelerated by electromagnetic force created by current flowing through outer and inner electrodes 20 and 22, respectively. The resulting plasma jet travels down the length of bore 40 and is ejected from muzzle end 38. The plasma ejected from railthruster 18 reaches muzzle exit velocities that are greater than the speed of sound and certainly greater than the velocity that can be achieved by thermal expansion alone.

The velocity of the plasma as it is ejected from muzzle end 38 may be increased by increasing length L of bore 40 in proportion to spacing W between electrodes 20 and 22. According to the present invention, the aspect ratio, which is defined herein as the ratio of bore length L to electrode spacing W, is at least 3:1, and is preferably on the order of at least 6:1. Aspect ratios of at least 10:1 have also proven useful in certain applications.

Figure 4:
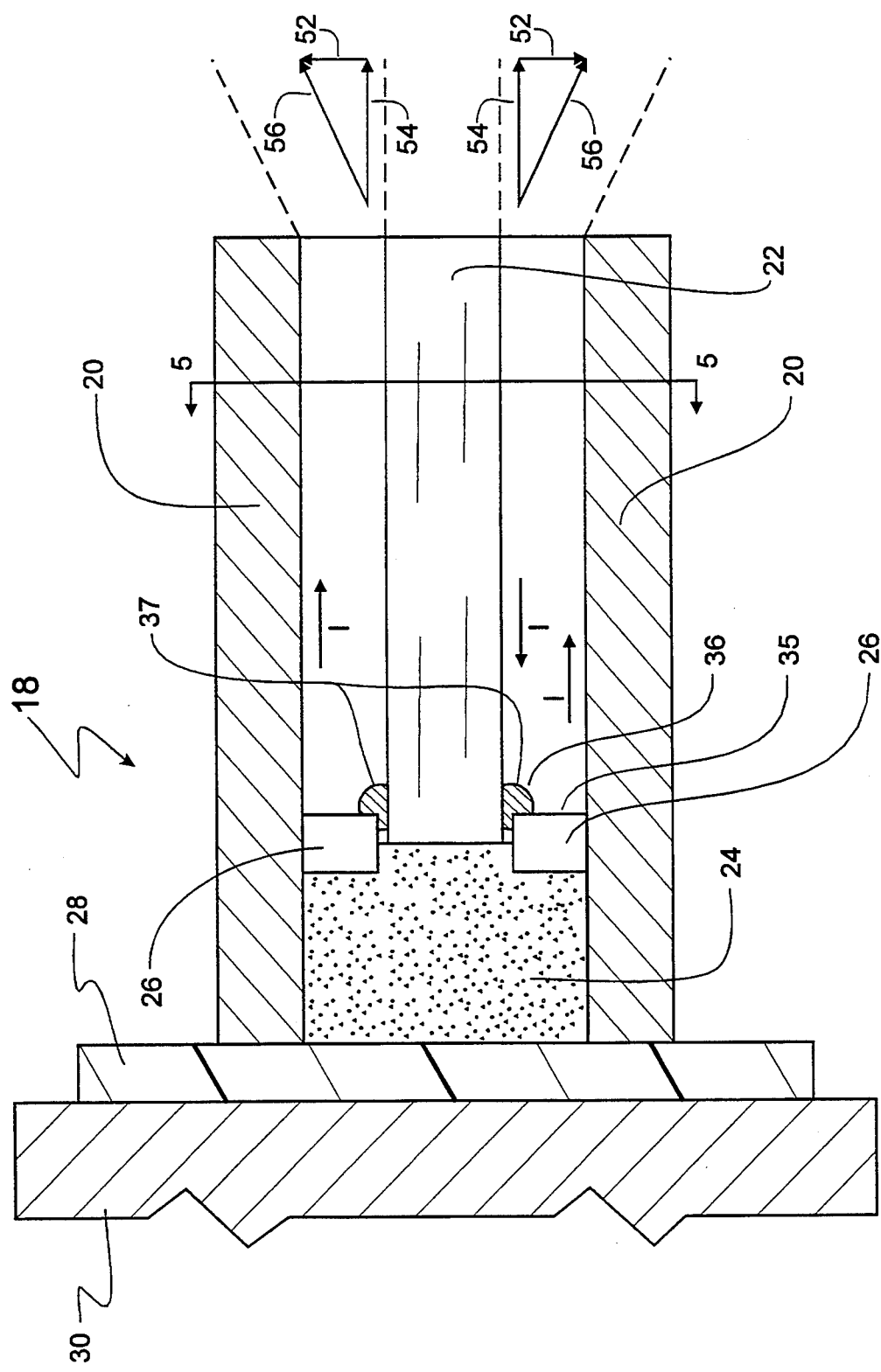
FIG. 4 is a cross-sectional view of plasma being propelled from the muzzle end of the coaxial electrode railthruster of FIG. 1.

FIG. 4 illustrates three velocity vectors attributable to the exiting plasma jet stream. Directed (kinetic) velocity vector 54 is shown as extending along the central axis of railthruster 18. Directed velocity 54 is the velocity vector of the plasma caused solely by electromagnetic force within railthruster 18. However, random (thermal) velocity 52 causes natural thermal expansion of the plasma as it exits muzzle end 38. If the exiting plasma is directed by thermal expansion forces, more so than by electromagnetic forces, then resultant velocity 56 would be at a more severe angle from the central axis causing a more immediate spread of exiting plasma. The invention's geometry is designed to maximize the electromagnetic acceleration. Therefore, random velocity 52 is reduced in comparison to directed velocity 54. In the present invention, then, resultant velocity vector 56 is therefore focused more toward the center of bore 40 than it is in MPD.

Figure 5:
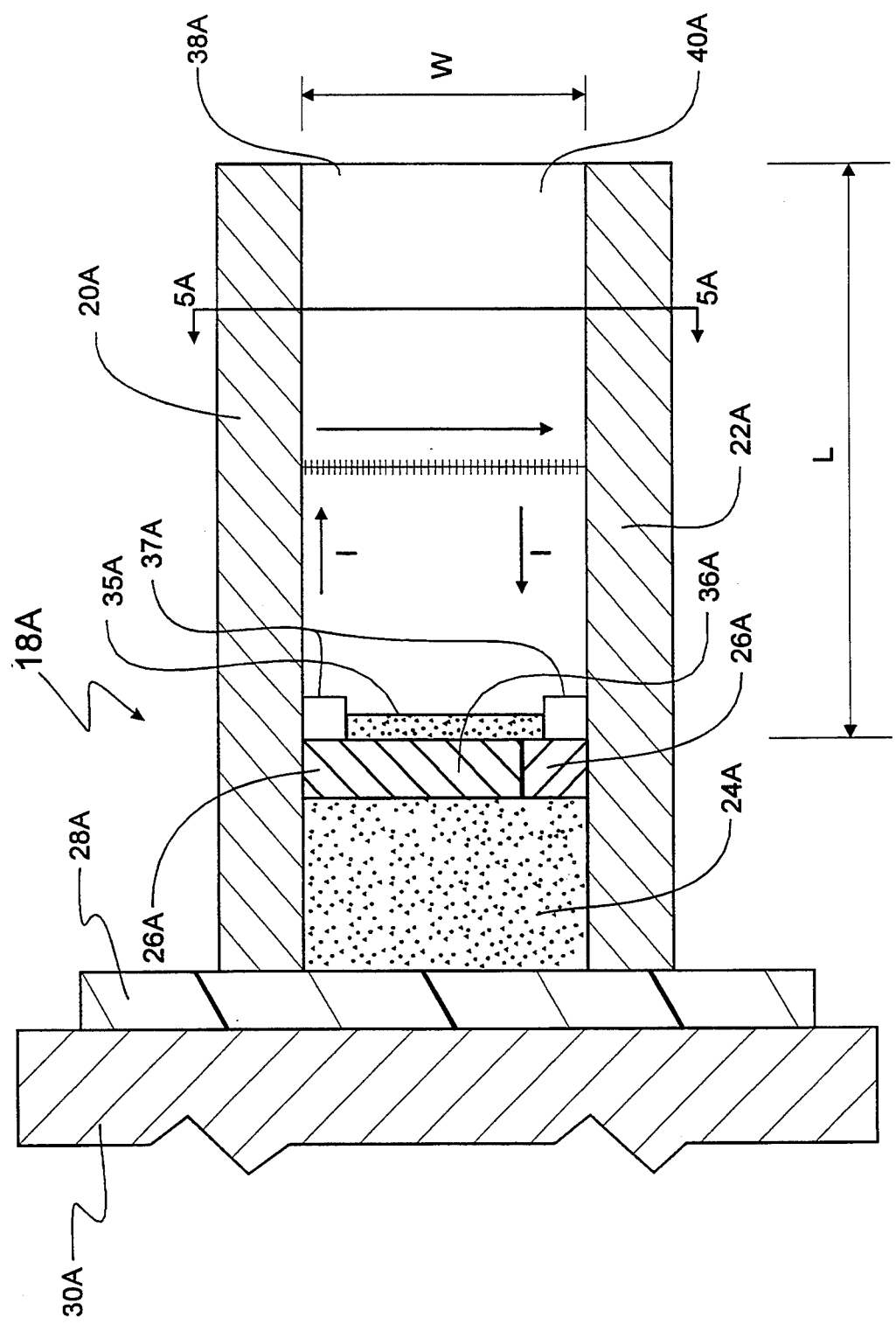
FIG. 5 is a perspective side view of a substantially parallel electrode railthruster alternative embodiment according to the present invention.

FIG. 5 is an alternative embodiment of the present invention having a dual-rail railthruster 18A. Dual-rail railthruster 18A comprises a pair of substantially parallel electrodes 20A and 20A. The spacing W between the pair of electrodes 20A and 20A may define an initiation gap 35A formed by protrusion 37A at bore 40A through which plasma is accelerated from initiation end 36A to the muzzle end 38A. The plasma jet is accelerated unidirectionally down bore 40A by an electromagnetic force created by pulsed current conductively coupled to the electrode pair 20A and 22A. The plasma jet is accelerated from plasma initiation end 36A, and accelerates down bore 40A until the plasma partially detaches from muzzle end 38A. The widths of electrodes 20A and 22A are preferably equal to bore width W. Once again, according to the present invention, the aspect ratio (ratio of bore length L to bore width W) is at least 3:1 and is preferably on the order of about 6:1. A ratio of at least 10:1 can also be effective in certain applications.

Figure 5A:
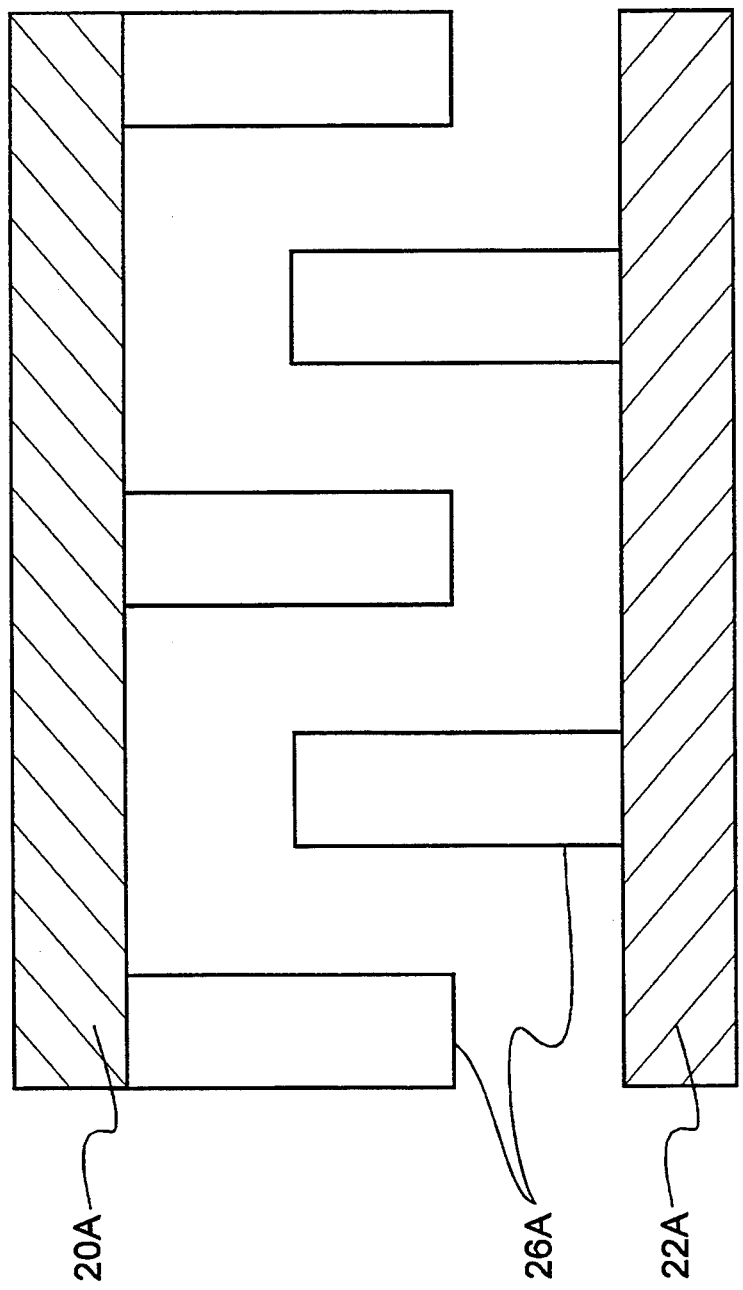
FIG. 5A is a cross-sectional view of ignition spokes through plane 5A—5A of FIG. 5.

FIG. 5A is a cross-section along plane 5A—5A in FIG. 5, and illustrates ignition spokes 26A for the parallel rail embodiment illustrated in FIG. 5.

Propellants for the railthruster should be selected based on several considerations, including low atomic weight, ease of storage on board the satellite, ease of ionization, safety, and reactivity with rail material. Because the railthruster does not ignite the propellant, unlike conventional rocket thrusters, the energetic property of the propellant is not a consideration. Suitable propellants for the railthruster include hydrogen, helium, and neon. The advantages of using hydrogen are: (1) hydrogen is the lightest of all gases; (2) hydrogen is easily ionized, with an ionization potential of 13.6 eV; and (3) hydrogen may be stored in the form of plastics, which is a much lighter storage method than storing hydrogen gas or liquid in pressure vessels. When stored in plastic form, the hydrogen is ablated and released from the plastic by evaporation or vaporization. Other acceptable fuels include helium and neon, which also are light and easily ionized; however, they are more difficult to store due to the need for pressure vessels, and are also comparatively more expensive than hydrogen.

Polyethylene ($C_nH_{2n+2}$) and polypropylene ($C_3H_5)_n$ are suitable plastics for solid-form storage of hydrogen propellant. They store well in space, and ablate with an insignificant amount of charring. Of these two, polyethylene is a preferred choice because it has a 20% higher hydrogen to carbon ratio, which is desirable to minimize any extra weight of the carbon atoms.

Figure 6:
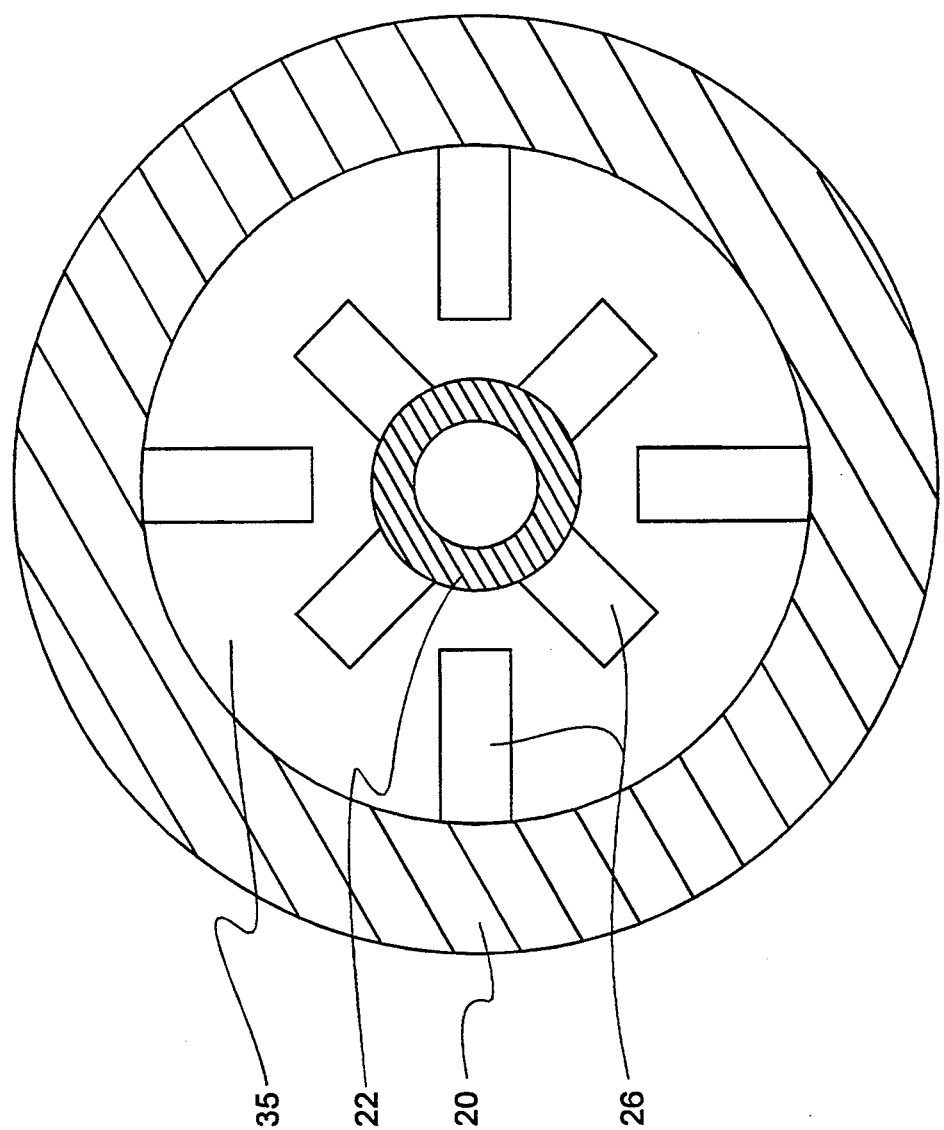
FIG. 6 is a cross-sectional view of ignition spokes through plane 6—6 of FIG. 3.

FIG. 6 illustrates a schematic of the railthruster featuring a solid propellant (for example, polyethylene) storage system. To help ensure initiation of the plasma at plasma initiation end 36, plurality of ignition spokes 26 may be placed at angles of 0°, 90°, 180° and 270° and connected to outer rail 22 at angles of, for example, 45°, 135°, 225° and 315°. During discharge of the power supply (see FIG. 7), the required mass of fuel 24 needed for a single firing to give a desirable thrust ablates, dissociates, and accelerates as a plasma mass. The carbon atoms that are dissociated from the solid propellants are also accelerated along with the hydrogen ions. However, the acceleration of carbon ions is much smaller than the acceleration of hydrogen ions due to their heavier weight.

Figure 7:
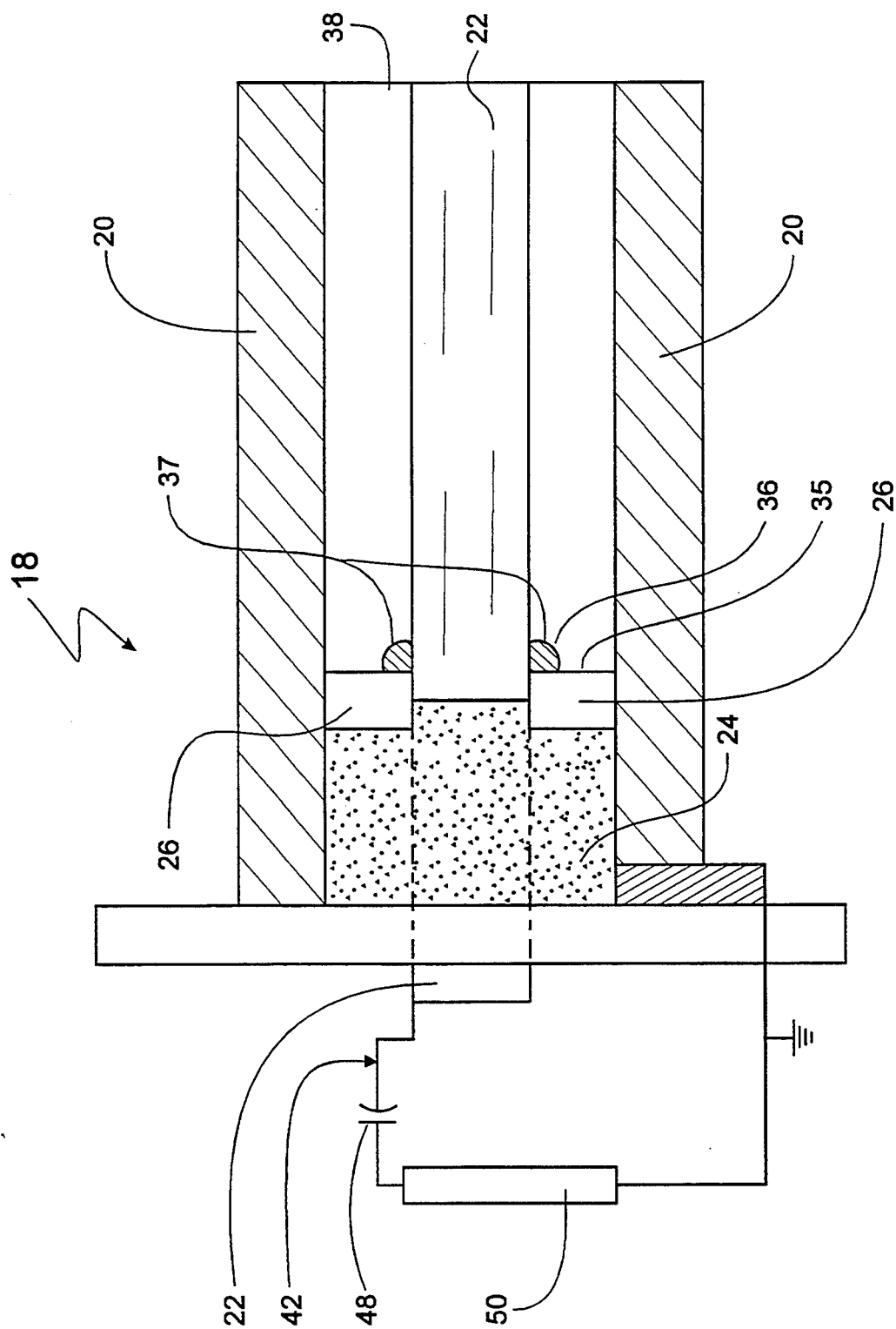
FIG. 7 is a diagrammatic view of a railthruster and corresponding power supply in accordance with the present invention.

The present invention also includes a high energy power supply 42 shown in FIG. 7 which can apply a short, intense burst of current. Attitude control thrusters generally require low thrusts, approximately in the range of from 0.5 to 2.5 N. Thus, pulse widths in the order of microseconds are required for precise control of the satellite orientation. Longer pulse widths than that required for the satellite orientation would mean unnecessary overcorrection. In addition, the pulse width of the power supply should be greater than or equal to the amount of time required by the plasma to travel across the length of the rails. A shorter pulse width than the time required by the plasma to travel across the rails implies that the current pulse would stop before the plasma reaches the end of the railgun and hence the necessary thrust would not be provided. The pulse width should be at most equal to the time constant of the power supplying device to ensure that the power supply does not internally dissipate its energy in a time shorter than the pulse width.

Other key considerations in the design of a suitable power supply for the railthruster of the present invention include source impedance, energy density, current, wear, and rotational stability of the satellite. To maximize the power output of the source, a low source impedance, which is the internal resistance of the power supply, is desired. Further, to minimize the weight of the thruster system, a high energy density is desirable. Current is also a very important parameter, because the power supply must be capable of generating high current levels to create the desired plasma acceleration. Higher electrode currents translate to an increase in $J \times B$ or electromagnetic force used to drive the plasma down bore 40. To accelerate plasma along the rails with speeds in the range of from 25 km/s to 125 km/s, high current levels of approximately from 1.5 kA to 3.5 kA are preferred. Finally, due to the lack of atmosphere in space and thus a lack of protective oxide layers, a power supply without moving parts is desired to minimize wear of the parts. Similarly, due to the lack of frictional effects in space, the rotating action of a power supply such as a compulsator would cause the satellite to rotate in an opposite direction, which is undesirable in devices designed to maintain satellite attitude control.

The power supply 42 illustrated in FIG. 7 uses capacitor 48 to provide pulsed power for railthruster 18. Capacitor 48 may be charged using solar energy panels on the satellite. Gate-turnoff thyristor (GTO) switch 50 controls the pulse width of the discharged energy, and is turned ON by a positive current to its gate, and turned OFF by a pulse of negative gate current, as explained more fully in J. R. Cogdell, *Foundations of Electrical Engineering*, 2d ed. (Englewood Cliffs, N.J.: Prentice Hall 1990). GTO switch 50 allows the discharge from capacitor 48 to last as long as the signal from the control system is supplied. Thus, depending on the pulse width, the control system can ensure that the pulse discharge lasts as long as the pulse width via GTO switch 50.

Each firing of railthruster 18 requires a hydrogen plasma mass of approximately $1.76^{E-10}$ kg to provide the desired thrust of at least 0.5 N. This required mass is obtained from the polyethylene solid propellant by discharging current from capacitor 48 for approximately $8.88^{E-6}$ seconds, which represents the pulse width of the power supply. The Lorentz force acting on the plasma then accelerates the plasma along the rails with an exhaust velocity in excess of 20 km/s. GTO switch 50 ensures that the current is supplied for the duration of the pulse width. GTO switch 50 may be repeatedly activated by a controller (not shown) to create a thruster burst when desired.

In comparison to prior thrusters, railthruster geometries are designed to enhance electromagnetic forces. The high electromagnetic force is produced by a high sustained current as the arc accelerates along the rails. Thus, railthrusters produce a smaller mass of plasma and a higher plasma velocity, resulting in a greater thrust with less consumption of fuel. In fact, the railthruster of the present invention may provide maximum plasma exit velocities of up to ten times that of known MPD thrusters, with twice the thrust efficiency. For example, known MPD thrusters provide velocities in the range of from 1500 m/s to 3200 m/s with a fuel consumption of from 0.32 g/s to 0.16 g/s. M. Mantenieks et al., "Performance of a 100 kW Class Applied Field MPD Thruster," *NASA Technical Memorandum* 102312, AIAA-89-2710 (1989). The railthruster of the present invention, in contrast, can provide velocities in excess of 20,000 m/s for the same thrust of 0.5 N with a fuel consumption of only 0.02 g/s as compared to 0.16 g/s for an MPD-type thruster.

The present invention has been disclosed in connection with specific embodiments. However, it will be apparent to those skilled in the art that variations from the illustrated embodiments may be undertaken without departing from the spirit and scope of the invention. For example, any power supply capable of delivering pulsed, high-current signals may be used. These and other variations will be apparent to those skilled in the art and are within the spirit and scope of the invention.

What is claimed is:

1. A satellite thruster system comprising:
    at least one thrust terminal;
    at least one railthruster connected to each thrust terminal by a mounting bracket, each railthruster including:
        first and second spaced apart electrodes extending along a central axis together defining a bore having a muzzle end and a plasma initiation end, a length of said bore being equal to a distance between said muzzle end and said plasma initiation end and a width of said bore being equal to a spacing between said first and second electrodes at said muzzle end, an aspect ratio of said bore exceeding 3:1;
        said first and second electrodes being coaxial; and
    a pulse generator for supplying pulsed electrical energy to each railthruster; and
    an electrical connection between said second electrode and said mounting bracket, said plasma initiation end being between said electrical connection and said muzzle end.

2. The thruster system of claim 1, said first and second electrodes extending substantially parallel to each other along a central axis.

3. The thruster system of claim 1, further comprising a radial ratio of at least 6:1.

4. The thruster system of claim 3, said radial ratio being at least 10:1.

5. The thruster system of claim 1, wherein a distance between said electrical connection and said plasma initiation end is greater than or equal to a diameter of said bore.

6. A satellite, comprising:
    at least one thrust terminal;
    at least one railthruster connected to each thrust terminal by a mounting bracket, each railthruster comprising:
        first and second spaced apart coaxial electrodes extending along a central axis together defining a bore having a muzzle end and a plasma initiation end, a length of said bore being equal to a distance between said muzzle end and said plasma initiation end and a width of said bore being equal to a spacing between said first and second electrodes at said muzzle end, an aspect ratio of said bore exceeding 3:1;
    a pulse generator for supplying pulsed electrical energy to each railthruster; and
    an electrical connection between said second electrode and said mounting bracket, said plasma initiation end being between said electrical connection and said muzzle end.

7. The satellite of claim 6, said aspect ratio being at least 6:1.

8. The satellite of claim 7, said aspect ratio being at least 10:1.

9. The satellite of claim 6, said pulse generator comprising:
    a high energy power supply, supplying high current to initiate a plasma jet proximate to said plasma initiation point; and
    a high energy switching means for selectively coupling current from said high energy power supply to each railthruster.

10. The satellite of claim 6, wherein said first electrode has at least one ignition spoke at said plasma initiation end which extends from said first electrode toward said second electrode and defines an initiation gap.

11. The satellite of claim 10, wherein said second electrode has at least one ignition spoke at said plasma initiation end which extends from said second electrode toward said first electrode and defines an initiation gap.

12. The thruster system of claim 11, further comprising a solid propellant coupled to said ignition spokes extending from said first and second electrodes.

13. The thruster system of claim 12, wherein said solid propellant is a plastic containing hydrogen.

14. The thruster system of claim 13, wherein said solid propellant is polyethylene.

15. The satellite of claim 6, said first and second electrodes being substantially parallel to each other.

16. The satellite device of claim 6, further comprising a radial ratio of at least 6:1.

17. The satellite of claim 16, said radial ratio being at least 10:1.

18. The satellite of claim 6, wherein a distance between said electrical connection and said plasma initiation end is greater than or equal to a diameter of said bore.

19. A railgun thruster device for generating and accelerating a high energy plasma jet, comprising:
    a mounting bracket including means for mounting said railgun thruster device to a utilization apparatus;
    first and second spaced apart coaxial electrodes extending along a central axis and defining a bore having a muzzle end and a plasma initiation end, said bore having a width equal to a spacing between said first and second electrodes at said muzzle end and a length equal to a distance between said muzzle end and said plasma initiation end, an aspect ratio of said bore being at least 3:1;
    said pair of electrodes being coated with a material extending for a distance of from 1 to 10 bore widths along said electrodes from said plasma initiation end, said material being selected from the group consisting of refractory metal, noble metal, precious metal, metal matrix composites and pyrolytic graphite; and
    an electrical connection between said second electrode and said mounting bracket, said plasma initiation end being between said electrical connection and said muzzle end.

20. The railgun thruster device of claim 19, said aspect ratio being at least 6:1.

21. The railgun thruster device of claim 20, said aspect ratio being at least 10:1.

22. The railgun thruster device of claim 19, wherein said first electrode has at least one ignition spoke at said plasma initiation end which extends from said first electrode toward said second electrode and defines an initiation gap.

23. The railgun thruster device of claim 22, wherein said second electrode has at least one ignition spoke at said plasma initiation end which extends from said second electrode toward said first electrode and defines an initiation gap.

24. The thruster system of claim 23, further comprising a solid propellant coupled to said ignition spokes extending from said first and second electrodes.

25. The thruster system of claim 24, wherein said solid propellant is a plastic containing hydrogen.

26. The thruster system of claim 25, wherein said solid propellant is polyethylene.

27. The railgun thruster device of claim 19, further comprising a radial ratio of at least 6:1.

28. The railgun thruster device of claim 27, said radial ratio being at least 10:1.

29. A satellite thruster system comprising:
at least one thrust terminal;
at least one railthruster connected to each thrust terminal by a mounting bracket, each railthruster including:
first and second spaced apart electrodes extending along a central axis together defining a bore having a muzzle end and a plasma initiation end, a length of said bore being equal to a distance between said muzzle end and said plasma initiation end and a width of said bore being equal to a spacing between said first and second electrodes at said muzzle end, an aspect ratio of said bore exceeding 3:1;
wherein said first electrode has at least one ignition spoke at said plasma initiation end which extends from said first electrode toward said second electrode and defines an initiation gap; and
wherein said second electrode has at least one ignition spoke at said plasma initiation end which extends from said second electrode toward said first electrode and defines an initiation gap; and
a pulse generator for supplying pulsed electrical energy to each railthruster;
an electrical connection between said second electrode and said mounting bracket, said plasma initiation end being between said electrical connection and said muzzle end; and
a solid propellant coupled to said ignition spokes.

30. The thruster system of claim 29, wherein said solid propellant is a plastic containing hydrogen.

31. The thruster system of claim 30, wherein said solid propellant is polyethylene.

* * * * *